United States Patent [19]

Hudson

[11] 4,249,976
[45] Feb. 10, 1981

[54] MANUFACTURE OF HONEYCOMB SANDWICH

[75] Inventor: Gordon F. Hudson, Huntington, N.Y.

[73] Assignee: Grumman Aerospace Corporation, Bethpage, N.Y.

[21] Appl. No.: 26,898

[22] Filed: Apr. 4, 1979

[51] Int. Cl.² .............................................. B32B 3/12
[52] U.S. Cl. .................. 156/286; 156/311; 428/116
[58] Field of Search ............... 428/73, 116, 117, 118; 156/197, 286, 311

[56] References Cited

U.S. PATENT DOCUMENTS

| | | | |
|---|---|---|---|
| 2,742,387 | 4/1956 | Giuliani | 428/116 X |
| 2,951,004 | 8/1960 | Martin et al. | 428/119 X |
| 3,067,507 | 12/1962 | Titus | 428/116 X |
| 3,391,056 | 7/1968 | Robinson, Jr. | 428/116 X |
| 3,438,843 | 4/1969 | Pagel | 428/116 X |
| 3,462,330 | 8/1969 | Greig et al. | 428/116 X |
| 3,481,427 | 12/1969 | Dobbs et al. | 428/116 X |
| 3,539,421 | 11/1970 | Crowe | 428/116 X |
| 3,616,140 | 10/1971 | Copeland et al. | 428/116 |
| 3,617,416 | 11/1971 | Kromrey | 428/117 X |
| 3,623,943 | 11/1971 | Altenpohl et al. | 428/339 X |
| 3,703,422 | 11/1972 | Yoshino | 428/116 X |
| 3,811,997 | 5/1974 | Yuan | 428/116 |
| 4,045,267 | 8/1977 | Davis et al. | 428/117 X |
| 4,052,523 | 10/1977 | Rhodes et al. | 428/116 |
| 4,053,667 | 10/1977 | Smith | 428/116 X |

Primary Examiner—Henry F. Epstein
Attorney, Agent, or Firm—Richard G. Geib; Bruce B. Brunda

[57] ABSTRACT

A method of continuously manufacturing honeycomb sandwiches is provided wherein skin panels of various materials may be more easily and effectively adhered to the honeycomb core. Thermoplastic adhesives which soften at temperatures above the laminate thermosetting temperature are used to provide firm bonding. Bondline voids, therefore, become less frequent and more easily repairable.

14 Claims, 5 Drawing Figures

U.S. Patent  Feb. 10, 1981  4,249,976
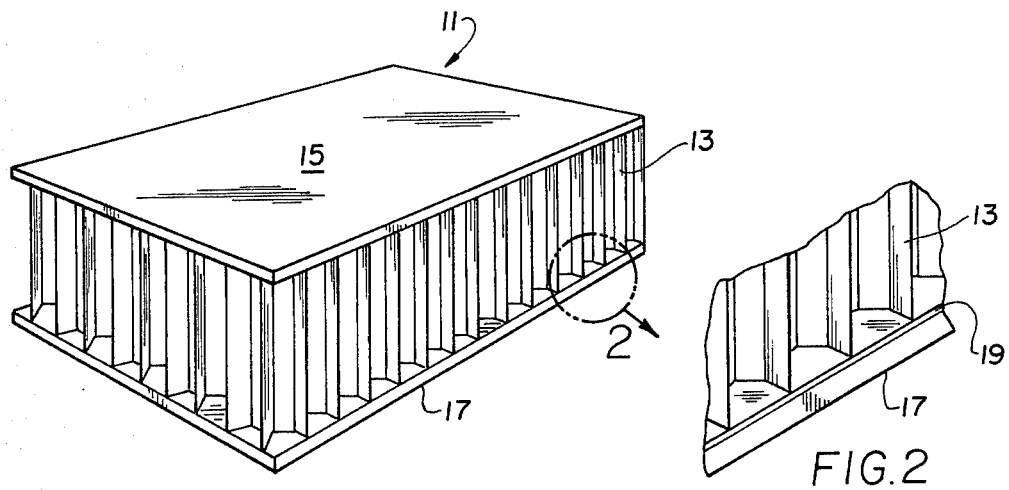
FIG.1
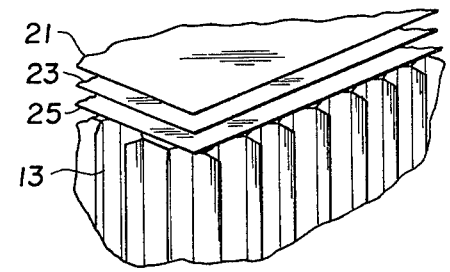
FIG.2
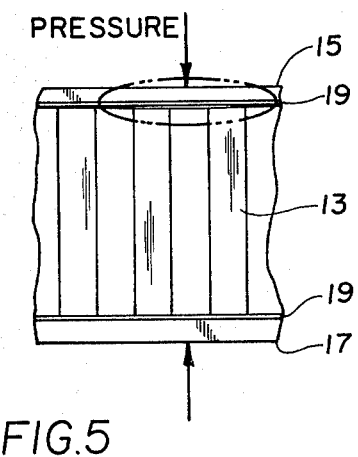
FIG.5
FIG.4
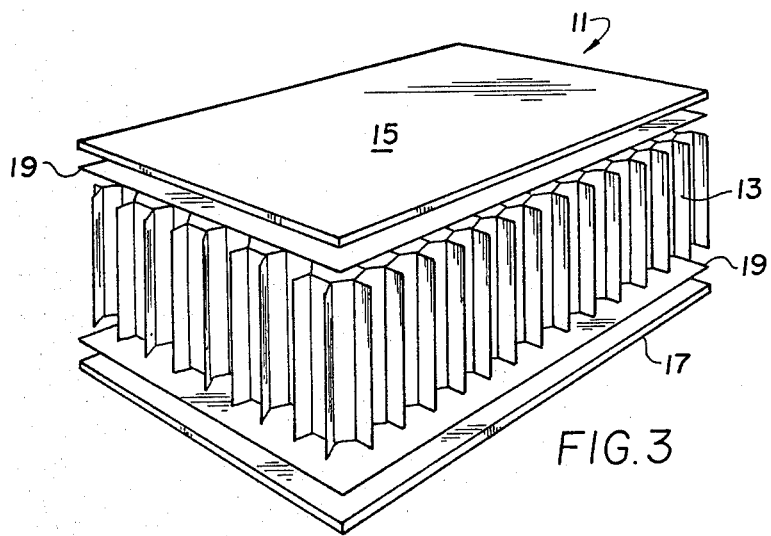
FIG.3

MANUFACTURE OF HONEYCOMB SANDWICH

This invention relates to a technique for producing honeycomb sandwich structures using thermoplastic adhesives, and more particularly, to a production process for adhering either rigid skin panels or uncured laminae to a honeycomb core.

This invention is particularly directed at providing a manufacturing technique suitable for high quality, low production run items. Flight vehicle sections are exemplary of this type of application.

Honeycomb cores have long been recognized as an excellent structural technique for stabilizing thin face sheets used in aircraft design. Combined with rigid skin panels to form sandwich type structures, these constructions provide very high strength per unit of weight. Full realization of these properties has heretofore been limited by economic consideration and deficiencies in the adhesive bonds that have been used to secure skin panels to the honeycomb core.

The existing practice for bonding aircraft skin panels to honeycomb cores is to use a thermosetting adhesive as the bonding material. Although this construction technique has a good record in service, it suffers serious efficiency problems for low production orders.

Thermosetting adhesives bond most effectively when distributed in a relatively thin, even, layer across fitted surfaces. Bond strengths are significantly degraded when the adhesive layer becomes too thick. In order to insure complete bonding between the honeycomb surface and the skin, one or more layers of mylar or polyvinyl chloride film can be draped between the surfaces to determine surface fitting. The assembly, or sandwich, is then placed in an autoclave and a vacuum is drawn.

The sandwich is thereafter withdrawn from the oven and separated to examine the film layer. If the two surfaces fit exactly, the film will indicate complete contact and the surface is ready to receive a thin, even coat of thermal-setting adhesive. Imperfect fitting, indicated by the film layer, can result in uneven bonding and voids along the contact surface.

Uneven surface portions must, therefore, be identified and made to fit evenly. In practice, bondline voids are often eliminated by shaving a protruding surface or thickening the glue layer in the void area. Since the structural integrity and uniformity of the assembly are affected by the varying either of these parameters, the end product is, therefore, less reliable and subject to deformity under demanding operating conditions. These prefitting processes often require several repetitions resulting in increased production costs as well as defective adhesive bonds.

Another, quite practical problem with using thermosetting adhesives to bond to a honeycomb core is that it makes any subsequent bondline repair a very difficult task. The common practice in making these repairs is to inject repair material into the honeycomb structure, with gravity typically working to conduct the repair material away from the surface where it is needed. If the repair material is made too thick, it flows to the defect area very poorly, whereas if the material flows more freely, its bonding strength is typically reduced. In either case, the repair substance fails to bond as well as the original thermosetting layer thereby reducing the possible benefit obtainable from any corrective effort. This is again an example of an expensive process which might not completely repair the defect or produce the intended design strength.

This and other corrective techniques have been utilized to insure adequate bonding between honeycomb sandwich surfaces. Inherent to such techniques, however, are technical or economical impediments including increased labor or production costs as well as the need to dedicate expensive equipment to the task.

In the present invention, a thermoplastic adhesive is used to bond the face sheets to the core, therefore, a void can be repaired by reheating the honeycomb sandwich, as to soften the thermoplastic adhesive, and pressing the face sheets together in the void area. No repair materials need to be added and consequently, the problem of identifying the location of the void, either blindly or by X-ray or ultrasonics has been eliminated.

One of the objects of the present invention is, therefore, to provide a technique for manufacturing honeycomb sandwich structures which are composed of rigid, heat resistant skin panels, firmly bonded to the honeycomb core.

It is a further object of the present invention to disclose a honeycomb sandwich manufacturing technique especially suited for providing an efficient high quality bonding technique for low production run items.

It is still another object of the present invention to disclose a honeycomb sandwich manufacturing technique wherein skin panels are strongly bonded to the honeycomb core without necessitating an extensive prefitting process to remove surface irregularities.

These and other objects and advantages are accomplished in the present invention by combining the honeycomb core, thermoplastic adhesive and laminate layer to form a collective assembly which is then cured and firmly bonded together in one continuous sequence under controlled temperature and pressure conditions. Thermosetting laminae form a heat resistant, rigid skin after which core bonding is provided by a melted layer of thermoplastic adhesive at a higher temperature. The use of thermoplastic adhesives eliminates the need for extensive prefitting of the contact surfaces, serves as a support layer on which the laminate may be cured, and also provides a strong adhesive bond to the core.

Bondline voids are, therefore, eliminated through careful control of the post-curing temperature and pressure. The curing and post-curing cycles are varied dependent upon structural requirements and the materials selected.

For a complete understanding of this invention, reference is made to the following detailed description and drawing, in which:

FIG. 1 is a perspective view of a honeycomb sandwich made in accordance with the present invention.

FIG. 2 is an enlarged sectional view of a portion of FIG. 1.

FIG. 3 is a perspective view of the sheets of material used in accordance with the technique of the present invention.

FIG. 4 is an enlarged sectional view of a portion of FIG. 3.

FIG. 5 is a front sectional view of a honeycomb sandwich which contains an area of borderline voids in the adhesive layer.

In FIG. 1, honeycomb sandwich 11 is shown consisting of a honeycomb core 13 between skin panels 15 and 17. A layer of thermoplastic adhesive 19, seen in FIG. 2, serves to bond the skin panels to the core.

Honeycomb cores are being increasingly used for a variety of structural designs where high strength per unit weight is a design requirement. The cores may be of different materials or patterns, but are generally composed of thin foil bands disposed perpendicularly to the plane of the sheet, being bent to form honeycomb-like cells between successive bands and joined with one another at areas of contact. In practice, the bands are usually metallic or plastic strips having a thickness of between 0.001–0.002 inch.

Bonding these honeycomb cores to flat reinforcing panels, as for example, external aircraft panels is typically a difficult operation. Bondline voids typically found in thermosetting adhesive layers can limit the effectiveness of surface bonds and be entirely unacceptable for critical applications such as in flight vehicles. While redundant production techniques can reduce the overall cost of tailor fitting the contact surfaces, all detailed parts must first be properly sized. Small production run items do not lend themselves to these techniques. These items, therefore, require substantial preparation to produce high quality bonding.

In FIG. 2, howing an enlarged sectional view of FIG. 1, thermoplastic adhesive layer 19 is more clearly illustrated. Skin panel 17 is shown here as one layer, although in practice the panel, or face sheet, may be from several to several hundred plies thick of various types of lamina. The number of layers to be used depends upon the load and stress level of the particular application.

FIG. 3 shows the laminate layers and adhesive layers slightly spaced from each other and the honeycomb core. Skin panel 15, appearing as a single layer in FIG. 3, is detailed in section in FIG. 4. This figure reveals three individual lamina layers, 21, 23 and 25, which collectively form the laminate panel 15.

The composition of the laminate layer would be dependent upon the particular application. Consideration must be given to the material properties of the different layers as compared to the anticipated operating environment. For flight vehicle applications, the skin panel is exposed to higher temperatures and must, therefore, have an even higher cure temperature to insure structural integrity under normal operating conditions. Graphite-epoxy, glass-epoxy and fiberglass cloth are all commonly used in laminate production. Other materials such as boron may also be used, however, they are substantially more expensive than the more common variety. In practice, virtually any reinforced plastic material may be used to form a portion of the skin.

After the sandwich is assembled, it must then be subjected to controlled heat and pressure conditions to allow proper curing of the laminate followed by bonding of the adhesive. The core must be selected to be able to withstand the curing pressure, typically 40 p.s.i., and postcuring temperature without significant structural degradation. A four to five pound cure is sufficient to withstand these manufacturing conditions.

Curing occurs in a temperature and pressure controlled environment, such as an autoclave and is preferably proceeded by evacuating the local environment about the sandwich assembly. One technique is to place the assembly in a plastic bag which is then evacuated. Curing temperatures may vary from 225° F. to 600° F.

Drawing a vacuum allows the air trapped within the uncured laminae to escape as the skin cures. Without a vacuum, internal voids, due to trapped air bubbles, are more likely to develop within the laminate.

The temperature is then raised to the laminate curing level and maintained there for a period of typically one to two hours. Pressure is sustained during the curing cycle at a level sufficient to compress the thermosetting plies together into a consolidated panel. The particular pressure level employed will be influenced by the intended application and the properties of the selected materials.

Since the thermoplastic layer has not yet reached its softening temperature, the layer remains rigid during the curing cycle and thereby acts as a support against which the laminate may be compressed.

In one application, a laminate of 30 plies was cured at a temperature of 350° F. for 1 hour. Pressure was maintained at 45 p.s.i.

While these parameters may vary, as previously explained, typical cure temperatures and pressure normal to the panels are in the range of 245° F. to 275° F., and about 8 p.s.i. to 45 p.s.i., respectively. The particular skin material and core type selected will influence the applied pressure levels.

During this laminate curing cycle, the thermoplastic adhesive remains hard since the laminate curing temperature is, by design, lower than the glass softening temperature of the thermoplastic layer. This allows the laminae to be compressed against the hard thermoplastic as the curing cycle progresses. A further temperature elevation allows the adhesive to soften and firmly bond to the laminate layer and honeycomb core. These temperature levels may typically be in the range of from 345° F. to 375° F., maintained for a period of from 0.2 to 2 hours. Pressure may be reduced from the laminate curing level to about 5 p.s.i., normal to the face of the panel. Higher pressure levels may be used to seat thicker skins in the proper location.

A continuous production technique is, therefore, provided wherein the laminate may be cured and bonded to the core in one uninterrupted process.

During the bonding cycle, the thermoplastic adhesive is carefully brought to a temperature where the adhesive film becomes soft enough to form fillets and firmly adhere to the contact surfaces, without losing too much of its viscosity as to wet the laminates and honeycomb surfaces. Only low pressure levels are necessary to insure sufficient bonding between the laminate and honeycomb core contact surfaces.

After the bonding cycle is completed, the temperature level is lowered below the thermoplastic softening temperature, thereby allowing the thermoplastic bond to harden. The assembly may then be post-cured and gradually cooled to room temperature. The post-curing cycle typically includes maintaining the bonded assembly at several discrete temperature levels for predetermined intervals of time. The precise temperature levels and intervals employed are again influenced by the intended application and the materials selected.

The thermoplastic bonds between the cured laminate and the honeycomb core will progressively harden as the temperature is reduced. A slow cool down cycle is generally preferable to prevent warping or cracking of the sandwich structure. The cycle should be fast enough to be efficient yet slow enough to meet the structural requirements of a particular application.

In order to insure proper formation of the laminate layer, it is generally preferable to allow the laminate to cure for several hours or longer in a temperature controlled environment. After the thermoplastic has been softened to allow bonding of the sandwich, the temperature is thereafter reduced. This causes hardening of the thermoplastic layer. Temperature is maintained at a level below the thermoplastic softening point yet high enough to permit complete curing of the laminate. During this post-curing cycle, the pressure level may be reduced to external environmental levels. The duration of the post-curing cycle may vary depending upon the particular materials used and the anticipated application requirements.

Since the use of a pressurized oven, such as an autoclave, involves considerable operating expenses, it may be preferable to remove the assembly from the autoclave shortly after the bonding cycle. Post-curing may then be accomplished in an ordinary oven thereby freeing the autoclave for other uses during this interval.

In one typical flight application, a nylon base thermoplastic adhesive was used with a graphite/epoxy laminate. After curing for 1 hour at 350° F. and 45 p.s.i., the sandwich was bonded for 15 minutes at 390° F. and 10 p.s.i. The assembly was then cooled slowly to post-curing temperature and the pressure reduced.

It should be noted that the present inventive technique may also be used in conjunction with prefabricated skin panels. In this situation, there is no need for curing or post-curing cycles. The panels may be securely bonded to the core by layering the thermoplastic adhesive between the prefabricated skin panel and the honeycomb core, and subsequently heating the assembly to the thermoplastic softening temperature in a low pressure environment.

As one skilled in the art will recognize, the present inventive technique could readily be used with various types of rolling, conveying and heating apparatus designed to communicate the several materials together and maintain this communication under predetermined pressure and temperature conditions. This variation is especially suitable when prefabricated skin panels are used, yet may also have application with regard to uncured laminae layers.

The application of heat in the curing cycle further acts as a catalyst to harden the skin structure. Subsequent heating, as required in the bonding and post-curing cycles, can further thermoset and improve the qualities of the laminate. Bonding and post-curing harden the laminate further and increases its moisture resistance characteristics.

It is necessary to select both the adhesive and laminate materials with regard to their characteristic properties, including their response to heat during the curing, bonding, and post-curing cycles. Generally, the thermoplastic material should have a softening temperature significantly higher than the temperature necessary to cure the laminae as to insure the integrity of the thermoplastic film. Since it is preferable to allow the thermoplastic layer to soften at a temperature above the laminate curing level, a wide band between the curing and post-curing cycles would contribute to greater production control and efficiency since the temperature need not be regulated as closely.

One excellent high temperature thermoplastic is polyethensulfone. Other nylon based thermoplastics may also be suitable for purposes of this invention. As with selection of the laminate, material for the thermoplastic layer is dependent upon the operating conditions of the structure, material cost and manufacturing characteristics.

In one application, a thermosetting laminate may be thermoplastically adhered to a honeycomb core, as follows:

(a) Place the uncured assembly in a bag and draw a local vacuum to 20 in. Hg, then place the bag in an autoclave.

(b) Pressurize the autoclave to 85 p.s.i., check bag for leaks and then depressurize.

(c) Heat the assembly to about 225° F., taking approximately 45 minutes.

(d) Repressurize to 85 p.s.i., and maintain for one hour.

(e) Reduce vacuum to 2 in. Hg, and raise temperature to 350° F., taking about one hour.

(f) Hold at 350° F., 85 p.s.i., for approximately one hour.

(g) Raise temperature to about 390° F. in 30 minutes, reducing pressure to 45 p.s.i.

(h) Hold at 390° F., 45 p.s.i., for thermoplastic bonding approximately 15 minutes and then allow to cool.

(i) Remove the assembly from the autoclave and post cure in oven at about 340° F. for about eight hours, then cool slowly.

FIG. 5 illustrates a void section in the adhesive layer between a honeycomb core and a skin panel section. Repair of these voids is a typical and recurring problem when the thermosetting adhesives are used. Tapping or ultrasonic inspection are typical techniques to determine the exact location of the void(s). Void repair can then be affected by the injection of additional adhesive material into the affected area.

The use of a thermoplastic material should greatly reduce the likelihood of such borderline voids because the thermoplastic layer flows more readily, thereby making any necessary repair a much simpler task. As shown in FIG. 5, void areas can be repaired by applying a small amount of pressure normal to the surface of the skin panel after it has been heated to a softer condition. This process significantly reduces the expense in both labor time and expertise necessary to make borderline repairs.

Having described several examples of present inventive process, it should be apparent that the preferred material selection and operation is a function of the particular application. Moreover, these and other variations which may be apparent to one skilled in the art may be made without departing from the spirit and scope of the present invention which is meant to be limited only by the appended claims which follow.

I claim:

1. A continuous method of producing a honeycomb sandwich assembly comprising:

layering a sheet of thermoplastic adhesive upon a honeycomb core;

setting a layer of thermosetting laminae upon said adhesive sheet as to form an unbonded assembly consisting of said honeycomb core, said adhesive sheet and said laminae layer;

locally evacuating the space about the unbonded assembly;

heating the unbonded assembly in a pressurized oven to the laminate curing temperature while supporting said layer of laminae upon said thermoplastic sheet;

maintaining laminate curing temperature and pressure levels until the laminate is substantially cured;

increasing the temperature while decreasing the pressure level within the pressurized oven until the assembly reaches thermoplastic softening temperature and bonding pressure levels;

compressing said softened thermoplastic layer as to form a bond between said honeycomb core and said laminate;

decreasing the temperature below the thermoplastic softening level and post-curing the bonded assembly; and slowly cooling the bonded assembly to room temperature.

2. The method as recited in claim 1 wherein said thermosetting laminae layer is formed by stacking a plurality of plies of reinforced thermosetting lamina.

3. The method as recited in claim 1 wherein the laminate is cured at a temperature between 225° F. and 600° F.

4. The method as recited in claim 1 wherein the laminate is cured at a pressure of between 8 p.s.i. and 45 p.s.i.

5. The method as recited in claim 1 wherein the assembly is bonded at a temperature between 345° F. and 375° F.

6. The method as recited in claim 1 wherein the assembly is bonded at a pressure of about 5 p.s.i.

7. The method as recited in claim 1 wherein said step of post-curing the assembly includes the step of maintaining the assembly at a series of discrete post-curing temperature levels, each of said discrete temperatures being sustained for a predetermined interval before proceeding to the succeeding discrete level.

8. A continuous method of producing a honeycomb sandwich assembly comprising:

layering a sheet of thermoplastic adhesive upon a honeycomb core;

setting a layer of thermosetting laminae upon said adhesive sheet as to form an unbonded assembly consisting of said honeycomb core, said adhesive sheet and said laminae layer;

locally evacuating the space about the assembly;

heating the assembly in a pressurized oven to the laminate curing temperature while supporting said layer of laminae upon said thermoplastic sheet;

maintaining laminate curing temperature and pressure levels until the laminate is substantially cured;

increasing the temperature while decreasing the pressure level within the pressurized oven until the assembly reaches thermoplastic softening temperature and bonding pressure levels;

compressing said softened thermoplastic layer as to form a bond between said honeycomb core and said laminate;

decreasing the temperature below the thermoplastic softening temperature;

removing the bonded assembly from the pressurized oven and relocating the bonded assembly in an unpressurized oven;

post-curing the bonded assembly in the unpressurized oven; and slowly cooling the bonded assembly to room temperature.

9. The method as recited in claim 8 wherein said thermosetting laminae layer is formed by stacking a plurality of plies of reinforced thermosetting lamina.

10. The method as recited in claim 8 wherein the laminate is cured at a temperature between 225° F. and 600° F.

11. The method as recited in claim 8 wherein the laminate is cured at a pressure of between 8 p.s.i. and 45 p.s.i.

12. The method as recited in claim 8 wherein the assembly is bonded at a temperature between 345° F. and 375° F.

13. The method as recited in claim 8 wherein the assembly is bonded at a pressure of about 5 p.s.i.

14. The method as recited in claim 8 wherein said step of post-curing the assembly includes the step of maintaining the assembly at a series of discrete post-curing temperature levels, each of said discrete temperatures being sustained for a predetermined interval before proceeding to the succeeding discrete level.

* * * * *